(12) United States Patent
Nagai et al.

(10) Patent No.: US 7,847,466 B2
(45) Date of Patent: Dec. 7, 2010

(54) LAMINATED CORE AND METHOD FOR MANUFACTURING THE SAME

(75) Inventors: Akira Nagai, Kitakyushu (JP); Iwao Myojin, Kitakyushu (JP)

(73) Assignee: Mitsui High-Tec, Inc., Kitakyushu-shi (JP)

( * ) Notice: Subject to any disclaimer, the term of this patent is extended or adjusted under 35 U.S.C. 154(b) by 329 days.

(21) Appl. No.: 12/095,570

(22) PCT Filed: Sep. 4, 2007

(86) PCT No.: PCT/JP2007/067214

§ 371 (c)(1),
(2), (4) Date: May 30, 2008

(87) PCT Pub. No.: WO2009/031204

PCT Pub. Date: Mar. 12, 2009

(65) Prior Publication Data

US 2010/0213785 A1  Aug. 26, 2010

(51) Int. Cl.
*H02K 1/06* (2006.01)
(52) U.S. Cl. .................. 310/216.043; 310/216.004
(58) Field of Classification Search ...... 310/216.04–13, 310/216.41–44
See application file for complete search history.

(56) References Cited

U.S. PATENT DOCUMENTS 3,842,493 A * 10/1974 Ohuchi et al. ............... 29/596

(Continued)

FOREIGN PATENT DOCUMENTS

JP           51-40506 A      4/1976

(Continued)

OTHER PUBLICATIONS

International Search Report of PCT-JP2007/067214, date of mailing Nov. 13, 2007.

(Continued)

*Primary Examiner*—Thanh Lam
(74) *Attorney, Agent, or Firm*—Westerman, Hattori, Daniels & Adrian, LLP (57) ABSTRACT

A laminated core (10) and a method for manufacturing the same, the laminated core (10) formed with a plurality of continuous segment core sheets (13) wound and laminated in a spiral form while connecting portions (12) mutually connecting the adjacent segment core sheets (13) are bent and side edges of the adjacent segment core sheets (13) are fitted with each other, the connecting portions (12) being located in an outer peripheral portion (11) of the laminated core (10), the laminated core (10) comprising:

a concave cutout (19) provided at a radially outward side of the connecting portion (12), the concave cutout (19) allowing a radial bulge (18) to be accommodated within an outer circle of the laminated core (19), the radial bulge (18) formed at a radially outward side of the connecting portion (12) by bending the connecting portion (12); and an inward cutout (20) provided at a radially inward side of the connecting portion (12), the inward cutout (20) defining a bending position of the connecting portion (12), wherein the connecting portion (12) has a narrow radial width and, before being bent, has a radial width in the range of 0.5 to 5 times a thickness of the segment core sheet (13).

The laminated core (10) and the method for manufacturing the same are capable of producing a highly-efficient and high-quality product that is free from effects of the swell in the thickness direction of the connecting portion (12).

16 Claims, 6 Drawing Sheets

U.S. PATENT DOCUMENTS

| | | | |
|---|---|---|---|
| 4,116,033 A * | 9/1978 | Iwaki et al. | 72/142 |
| 4,364,169 A * | 12/1982 | Kawano et al. | 29/596 |
| 4,365,180 A * | 12/1982 | Licata et al. | 310/216.008 |
| 5,859,486 A | 1/1999 | Nakahara et al. | |
| 6,121,711 A | 9/2000 | Nakahara et al. | |
| 6,147,431 A * | 11/2000 | Asao et al. | 310/216.004 |
| 6,167,610 B1 | 1/2001 | Nakahara et al. | |
| 6,323,571 B1 | 11/2001 | Nakahara et al. | |
| 6,362,553 B1 | 3/2002 | Nakahara et al. | |
| 6,630,766 B1 * | 10/2003 | Kirn et al. | 310/418 |
| 6,919,665 B2 * | 7/2005 | Murakami et al. | 310/216.043 |
| 7,777,387 B2 * | 8/2010 | Nagai et al. | 310/216.043 |
| 2002/0163277 A1 | 11/2002 | Miyake et al. | |
| 2003/0127938 A1 * | 7/2003 | Shen et al. | 310/216 |

FOREIGN PATENT DOCUMENTS

| | | |
|---|---|---|
| JP | 1-264548 A | 10/1989 |
| JP | 8-196061 A | 7/1996 |
| JP | 11-220844 A1 | 8/1999 |
| JP | 11-262202 A | 9/1999 |
| JP | 2000-152526 A | 5/2000 |
| JP | 2001-268825 A | 9/2001 |
| JP | 2004-505595 A | 2/2004 |
| JP | 2005-160170 A | 6/2005 |
| WO | 02-19498 A1 | 3/2002 |

OTHER PUBLICATIONS

Japanese Office Action dated Apr. 13, 2010, issued in corresponding Japanese Patent Application No. 2006-280430.

Japanese Office Action dated Dec. 1, 2009, issued in corresponding Japanese Patent Application No. 2006-280430.

* cited by examiner

LAMINATED CORE AND METHOD FOR MANUFACTURING THE SAME

TECHNICAL FIELD

The present invention relates to a laminated core formed by spirally winding and laminating a plurality of segment core sheets continuous with one another in a band shape, and to a method for manufacturing the laminated core.

BACKGROUND ART

For improving yield of core materials (e.g., strip materials) used for producing laminated cores, there has been known so-called wound cores produced by punching out from a core material not a plurality of continuous segment core sheets in a ring shape but a plurality of segment core sheets in a band shape and winding and laminating the segment core sheets.

In particular, arc-shaped segment core sheets connected together by connecting portions and having a predetermined number of slots are punched out from a core material using dies. Then, the continuous segment core sheets are wound in a spiral form and laminated while the connecting portions located in outer peripheral portions of the segment core sheets are bent and side edges of the adjacent core sheets are fitted with each other. When viewed in a laminating direction of the laminated core, the adjacent connecting portions are in circumferentially different positions and the segment core sheets and the connecting portions are vertically next to each other (See Japanese Unexamined Patent Publication No. 1-264548, Japanese Unexamined Patent Publication No. 8-196061, and Published Japanese Translation of PCT International Application No. 2004-505595, for example).

However, in the conventional art disclosed in the publications, when the connecting portions are bent to position the plurality of segment core sheets in an annular form, bulges are formed in the connecting portions in a thickness direction thereof. The bulges create gaps between the laminated segment core sheets, thereby causing variations in thicknesses of manufactured laminated cores. In the assembly of motors having the laminated cores, for example, extra pressure treatments have been required to eliminate the gaps. Furthermore, the gaps cause reduced efficiency and vibration in the motors, thereby adversely affecting the quality of the motors.

The present invention has been made in view of the above circumstances, and an object thereof is to provide a highly-efficient and high-quality laminated core that is free from effects of bulges formed in the thickness direction of the connecting portions, and a method for manufacturing the laminated core.

DISCLOSURE OF INVENTION

To accomplish the object, in a first invention, the present invention provides a laminated core formed with a plurality of continuous segment core sheets wound and laminated in a spiral form while connecting portions mutually connecting the adjacent segment core sheets are bent and side edges of the adjacent segment core sheets are fitted with each other, the connecting portions being located in an outer peripheral portion of the laminated core, the laminated core comprising: a concave cutout provided at a radially outward side of the connecting portion, the concave cutout allowing a radial bulge to be accommodated within an outer circle of the laminated core, the radial bulge formed at a radially outward side of the connecting portion by bending the connecting portion; and an inward cutout provided at a radially inward side of the connecting portion, the inward cutout defining a bending position of the connecting portion, wherein the connecting portion has a narrow radial width and, before being bent, has a radial width in the range of 0.5 to 5 times a thickness of the segment core sheet.

To accomplish the object, in a second invention, the present invention provides a method for manufacturing a laminated core, comprising: a stamping step of forming a plurality of continuous segment core sheets mutually connected by connecting portions, the connecting portions provided in outer peripheral portions of the segment core sheets; and an annular-shape forming step of winding and laminating the connected segment core sheets in a spiral form while bending the connecting portions and fitting side edges of the adjacent core sheets with each other, wherein in the stamping step, a concave cutout allowing a radial bulge to be accommodated within an outer circle of the laminated core is formed at a radially outward side of the connecting portion, the bulge formed at a radially outward side of the connecting portion by bending the connecting portion; and an inward cutout defining a bending position of the connecting portion is formed at a radially inward side of the connecting portion, the connecting portion having a radial width in the range of 0.5 to 5 times a thickness of the segment core sheet, the width being narrow.

According to the laminated core in the first invention, and the method for manufacturing the same in the second invention, before being bent, the connecting portions each mutually connecting the adjacent segment core sheets have a narrow radial width that is in an appropriate range with respect to the thickness of the segment core sheet. Accordingly, the bulge in the thickness direction of the connecting portion caused by bending the connecting portion is curbed.

Accordingly, the formation of gaps between the laminated segment core sheets is inhibited, and further prevented. Thus, the quality control of the laminated core becomes easy, and the vibration of motors using the laminated cores is prevented to improve the efficiency of the motors.

According to the laminated core in the first invention, it is preferable that, before being bent, the connecting portion has a partly or wholly constant radial width.

According to the structure, a local stress concentration on the connecting portion caused by bending the connecting portion is reduced. Additionally, a local compressive stress at the radially inward region of the connecting portion is reduced, and the swell of the connecting portion in the thickness direction is inhibited. At the same time, a local tensile stress in the radially outward region is reduced, which inhibits the fracture of the connecting portion.

According to the laminated core in the first aspect, before being bent, the connecting portion may have an arc shape, and a center of curvature radially outside of the segment core sheet.

This can reduce the formation of the radial bulge at the radially outward side of the connecting portion caused by bending the connecting portion. Additionally, a compressive stress caused by bending the connecting portion can be distributed in the circumferential direction. Furthermore, the bulge in the thickness direction of the connecting portion can be curbed since the connecting portion has a long length.

Furthermore, after being bent, the connecting portion may have a straight shape.

On the other hand, according to the laminated core in the first aspect, before being bent, the connecting portion may have an arc shape, and a center of curvature radially inside of the segment core sheet.

Due to the structure, when being bent, the connecting portion is reduced in width without being curved in the direction opposite to the curvature of the connecting portion before being bent. Accordingly, the application of a great local pressure to the connecting portion can be prevented, which reduces the risk of breaking the connecting portion at the time of bending the connecting portion. Thus, the laminated core is produced with high productivity.

Furthermore, according to the laminated core in the first invention, before being bent, the connecting portion may have a wave shape.

In such a case, even though the connecting portion is subjected to a tensile force in the circumferential direction, the force is absorbed by the bent connecting portion that is stretched by the application of the force. Accordingly, the application of a great local force to the connecting portion can be prevented, which reduces the risk of the connecting portion being torn at the time of bending the connecting portion. Thus, the laminated core is produced with high productivity.

In particular, the connecting portion may have, at its midsection in a circumferential direction thereof, a wave crest projecting radially inward.

Thus, the formation of the bulge at the radially outward side of the connecting portion caused by bending the connecting portion is reliably prevented.

According to the laminated core in the first invention, it is preferable that a center line extending between an outer edge and an inner edge of the connecting portion has a length unchanged before and after the bending of the connecting portion, the outer edge provided by the formation of the concave cutout, the inner edge provided by the formation of the inward cutout.

Accordingly, an excessive tensile stress or compressive stress on the connecting portion caused by bending the connecting portion is prevented.

According to the laminated core in the first invention, it is preferable that the side edges of the adjacent segment core sheets are closely spaced from each other.

Thus, variations in pitches of the segment core sheets in the circumferential direction can be prevented, which in turn prevents, for example, displacement of interlocking positions of the segment core sheets in the laminating direction. Furthermore, due to the closely spaced side edges of the adjacent segment core sheets, for example, if cutting edges of dies for punching out the segment core sheets are worn and burrs are generated at the side edges of the core sheets, the contact between the burrs is prevented. Thus, misalignment of pitches of the segment core sheets in the circumferential direction can be prevented.

According to the laminated core in the first invention, the side edges of the adjacent segment core sheets may have respectively pressing portions at radially outward sides thereof, the pressing portions coming into contact with the radially inward side of the connecting portion at the bending of the connecting portion and pushing the connecting portion radially outward.

In such a case, a compressive stress in the vicinity of the center of curvature of the connecting portion caused by bending the connecting portion is decreased, which inhibits a force of the connecting portion to expand in the thickness direction and thus reduces the bulge of the connecting portion.

BEST MODE FOR CARRYING OUT THE INVENTION

Figure 1:
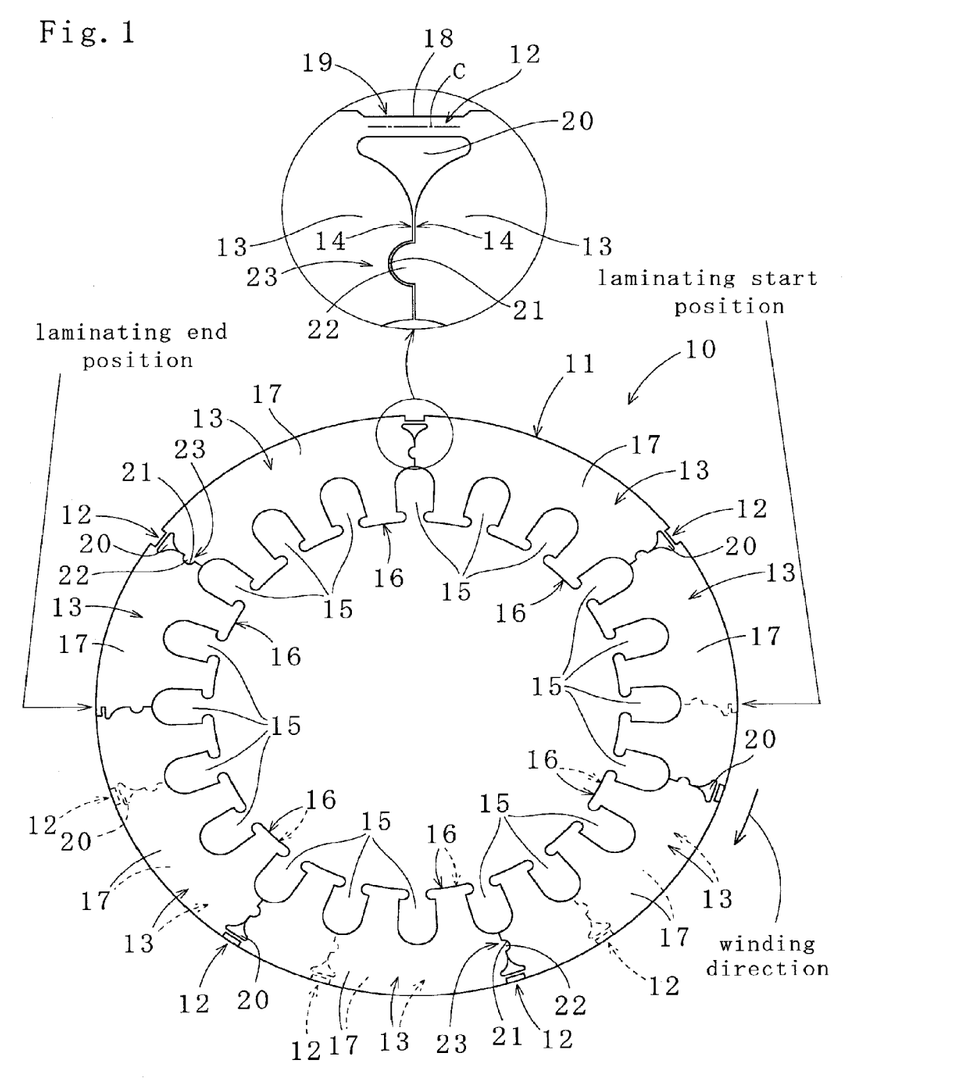
FIG. 1 is a plan view of a laminated core according to one embodiment of the present invention.
Figure 2:
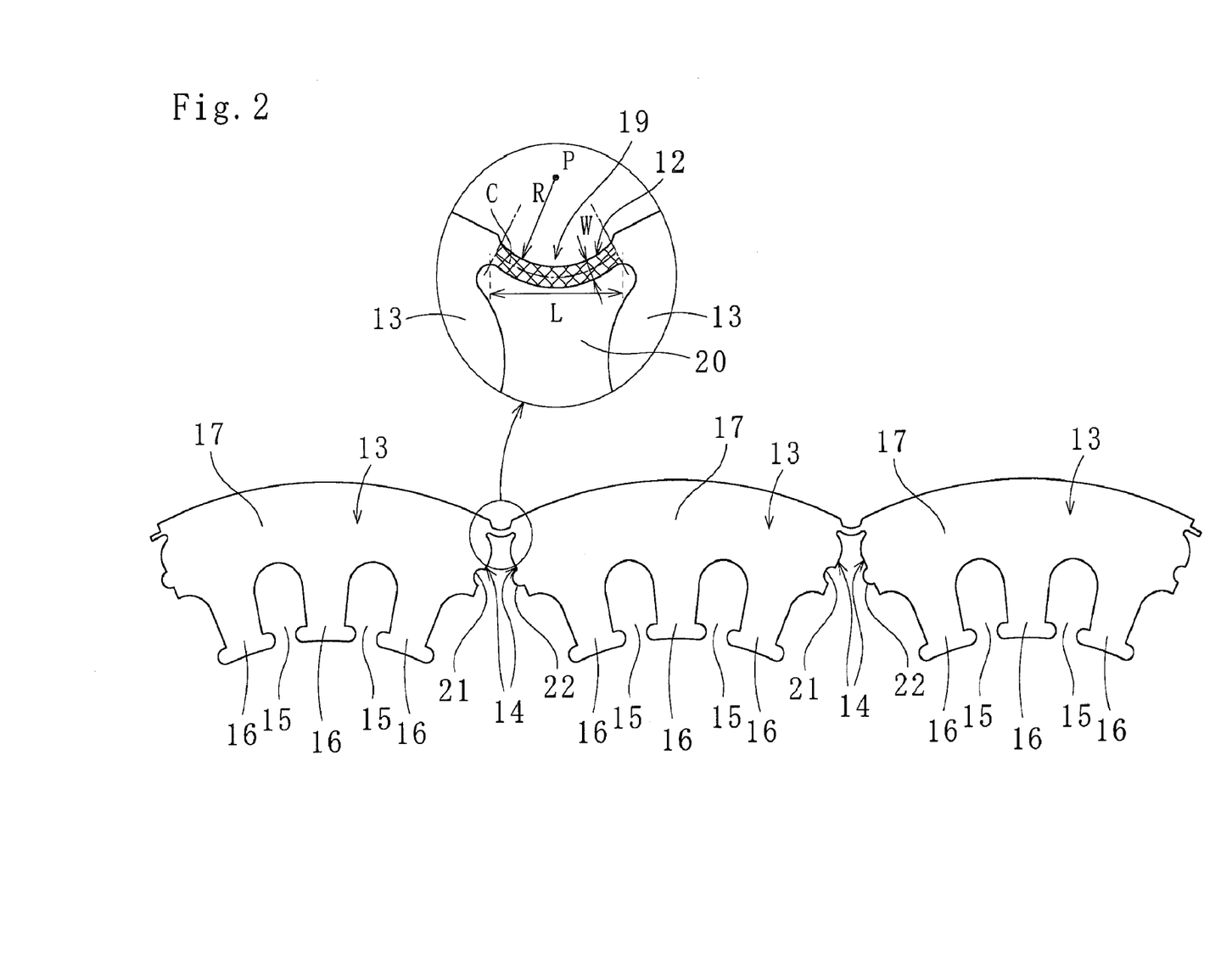
FIG. 2 is a partial plan view illustrating segment core sheets of the laminated core before the segment core sheets are laminated.

As illustrated in FIGS. 1 and 2, a laminated core 10 according to one embodiment of the present invention is a laminated stator core (also referred to as a stator). The laminated core 10 includes segment core sheets 13 continuous with one another by connecting portions 12 located in an outer peripheral portion 11. The connecting portions 12 are wound in a spiral form and laminated while the connecting portions 12 are bent and side edges 14 of the segment core sheets 13 are fitted with each other. A width W in the radial direction of the connecting portion 12 before being bent is narrow. The above components are described in detail hereunder.

The plurality of segment core sheets 13 coupled by the connecting portions 12 are punched out using dies from a magnetic steel sheet (not illustrated) having a thickness of, e.g., less than or equal to about 0.5 mm (0.35 mm in this embodiment). As illustrated in FIGS. 1 and 2, the segment core sheets 13 in series are wound, laminated, and interlocked sequentially to produce the laminated core 10. To laminate the plurality of segment core sheets, interlocking, welding and bonding may be employed singly or in combination of two or more of them.

Each of the segment core sheets 13 has a plurality of slots 15 and pole sections 16 at the radially inward side thereof, and a yoke section 17 at the radially outward side thereof.

The connecting portions 12 are provided between the adjacent segment core sheets 13 in order to connect the segment core sheets 13 in the outer peripheral portion 11.

A concave cutout 19 is provided at the radially outward side of each of the connecting portions 12 to accommodate a radial bulge 18 within the outer circumference of the laminated core 10. The radial bulge 18 is formed at a radially outward side of the connecting portion 12 by bending the connecting portion 12. Thus, as illustrated in FIG. 2, the outer peripheries of the connecting portions 12 are depressed in the radially inward direction before the connecting portions 12 are bent.

Additionally, an inward cutout 20 is provided at the radially inward side of each connecting portion 12 (between the radially outward portions of the respective side edges 14) in a manner that the connecting portion 12 before being bent has a constant radial width. The inward cutout 20 defines a bending position of the connecting portion 12.

After inward cutout 20 has an inverted triangle shape after the connecting portion 12 is bent, and forms space between the radially outward portions of the side edges 14 of the adjacent segment core sheets 13. Thus, the radially inward portions of the side edges 14 of the adjacent segment core sheets 13 are fitted with each other, whereas the radially outward portions thereof are out of contact with each other.

According to the configuration described above, the inward cutouts 20 respectively provided at the radially outward side of the connecting portions 12 give a hinging effect to the connecting portions 12 at the time of bending the connecting portion 12.

The connecting portion 12 defined by the concave cutout 19 and the inward cutout 20 is arc-shaped before being bent, and has a center P of curvature radially outside of the segment core sheets 13. The connecting portion 12 has a radius R of curvature adjusted so that when being bent, the connecting portion 12 is straight in the longitudinal direction as illustrated in FIG. 1. For example, the radius of curvature R is about 1-5 mm (2-3 mm in this embodiment). The bent connecting portion 12 is projected radially outward compared to the connecting portion 12 before being bent. However, the bent connecting portion 12, which is straight and has the concave cutout 19, is positioned inside the outer circle of the laminated core 10.

In this embodiment, it is preferable to shape the connecting portion so that a center line extending between an outer edge (outer arc before the connecting portion being bent) and an inner edge (inner arc before the connecting portion being bent) which are provided by the concave cutout 19 and the inward cutout 20, respectively, (length of the center formed in the longitudinal direction of the connecting portion) has the same length before and after the bending of the connecting portion. In the event that the center line C of the connecting portion before being bent is shorter than that of the bent connecting portion, the length of the center line C of the bent connecting portion is set to a tolerance of 0%, or a tolerance within a range of greater than 0% to equal to or less than 50% (preferably 20-50% inclusive), of the elongation of the material which forms the segment core sheets (the magnetic steel sheet in this embodiment).

Figure 3:
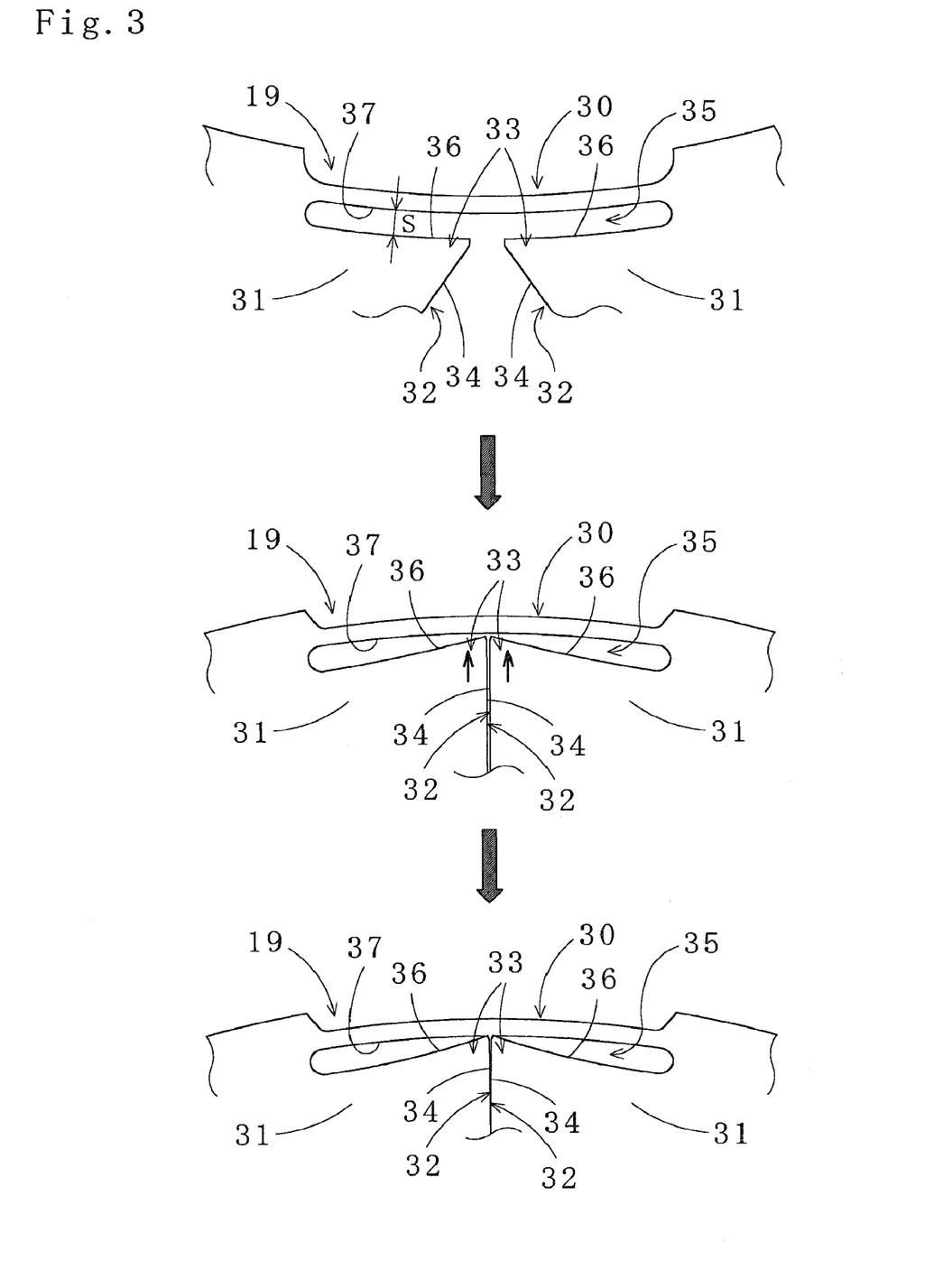
FIG. 3 is a descriptive illustration of before and after bending a connecting portion according to a first modification of the laminated core.

As illustrated in FIG. 3, a connecting portion 30 may be arc-shaped before being bent with a center of curvature positioned radially outside of a segment core sheet 31, and pressing portions 33 may be provided at radially outward sides of side edges 32 of the adjacent segment core sheets 31.

The pressing portions 33 each are acute (may include a chamfer) or arc-shaped when viewed from the top thereof. Each of the pressing portions 33 consists of an area defined by a contact side 34 forming a part of a facing side of the side edge 32 of the segment core sheet 31 and a side 36 forming a part of an inward cutout 35. Before the connecting portion 30 is bent, the side 36 is spaced apart from an inward side 37 facing the inward cutout 35 of the connecting portion 30, with a constant space S between the side 36 and the inward side 37. The space S before the bending of the connecting portion 30, i.e., the space S between the connecting portion 30 and the pressing portion 33, is, e.g., about 1-2 times the width in the radial direction of the connecting portion 30, and thus the space is narrow.

At the time of bending the connecting portion 30, the side edges 32 of the adjacent segment core sheets 31 are fitted with each other, that is, the contact sides 34 of the mutually facing pressing portions 33 are fitted, so that the top corners of the pressing portions 33 come into contact with the inward side 37 of the connecting portion 30 at one point thereby to push the connecting portion 30 in the radially outward direction. In this instance, the concave cutout 19 allows the pushed connecting portion 30 to be disposed within the outer circle of the laminated core.

Figure 4:
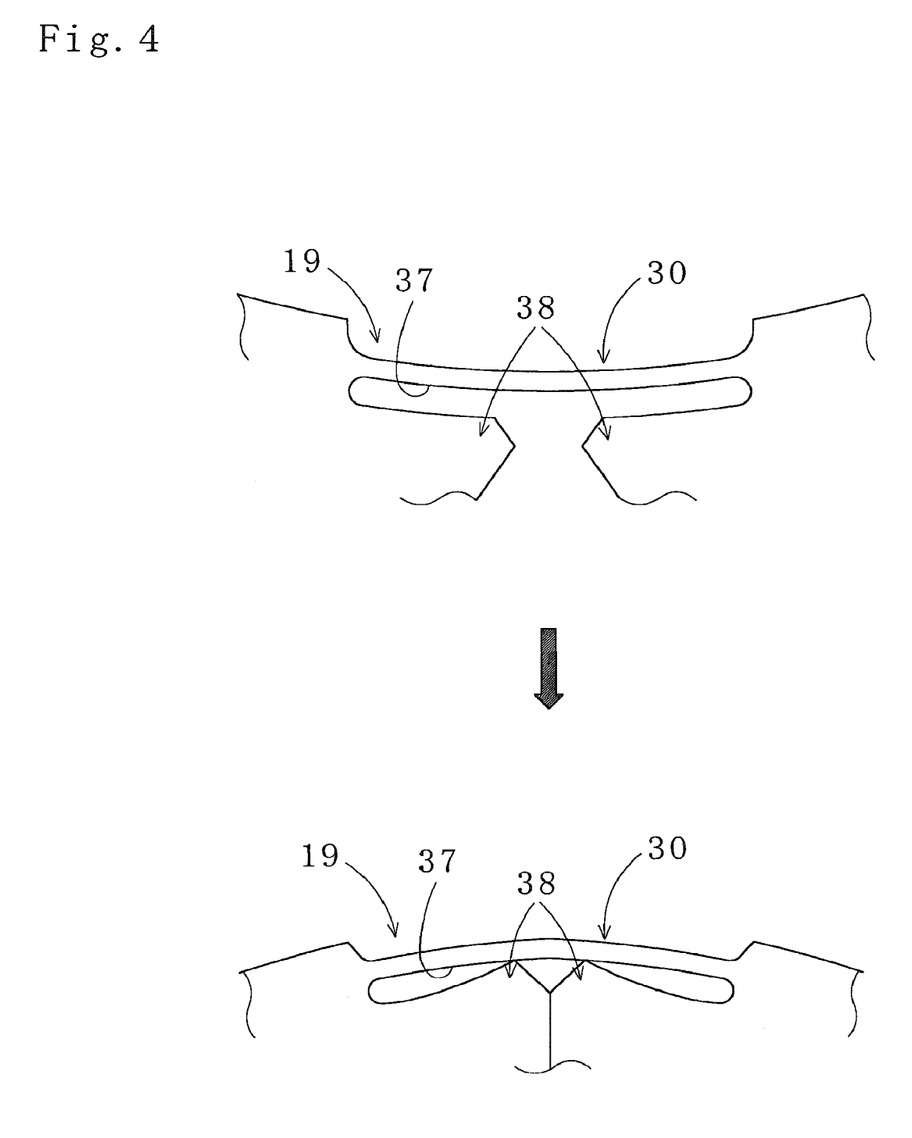
FIG. 4 is a descriptive illustration of before and after bending a connecting portion according to a second modification of the laminated core.

The shape of the pressing portion is not limited to the above shape, as long as the connecting portion pushed out by the pressing portions is placed within the outer circle, in particular, within the concave cutout 19. For example, as illustrated in FIG. 4, pressing portions 38 formed by chamfering the large parts of the corners of the pressing portions 33 illustrated in FIG. 3 are brought into contact with the inward side 37 of the connecting portion 30 at two different points to push out the connecting portion 30 in the radially outward direction. In this case, the connecting portion 30 is less projected radially outward, compared to when it is pushed at one point. Thus, for example, the connecting portion having a further increased length can be accommodated within the concave cutout. Furthermore, pressing the connecting portion at two points allows the connecting portion to be extended longer in the circumferential direction than pressing it at one point, and suppresses a swell of the connecting portion in the thickness direction. Still furthermore, the pressing portions before the bending may have a shape projected toward the connecting portion.

Accordingly, compressive stress on the connecting portion 30 caused by bending the connecting portion 30 can be reduced, which curbs the swell in the thickness direction of the connecting portion 30.

Figure 5:
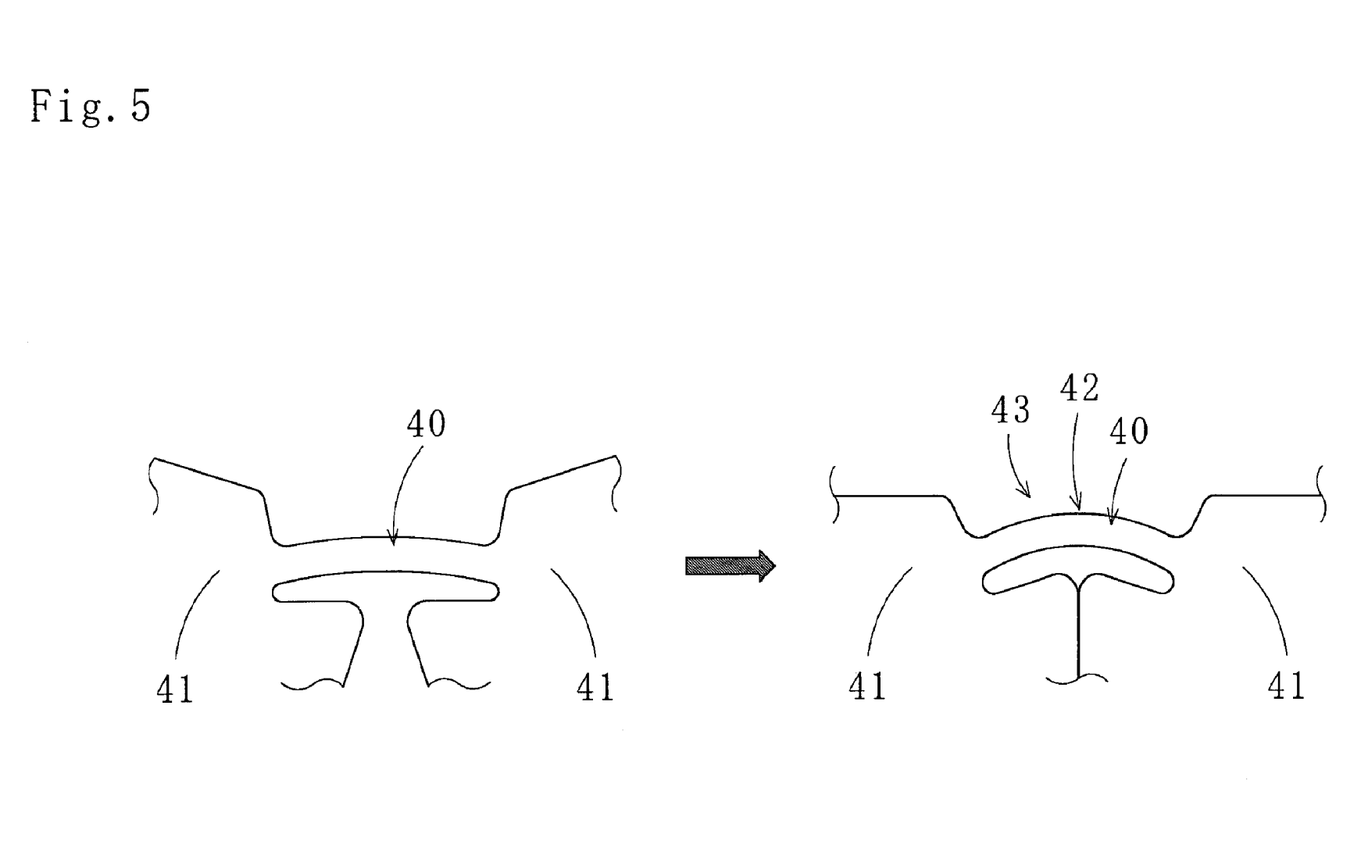
FIG. 5 is a descriptive illustration of before and after bending a connecting portion according to a third modification of the laminated core.

As illustrated in FIG. 5, a connecting portion 40 before being bent may be arc-shaped with a center of curvature positioned radially inside of a segment core sheet 41. In this instance, the shape of the connecting portion 40 before being bent is determined so that a radial bulge 42 formed by bending the connecting portion 40 may be disposed within the outer circle of the laminated core due to a concave cutout 43 provided at the radially outward side of the connecting portion 40. Alternatively, the shape of the connecting portion 40 before being bent may be straight. In this instance, the radial bulge is also disposed within the outer circle of the laminated core.

Figure 6:
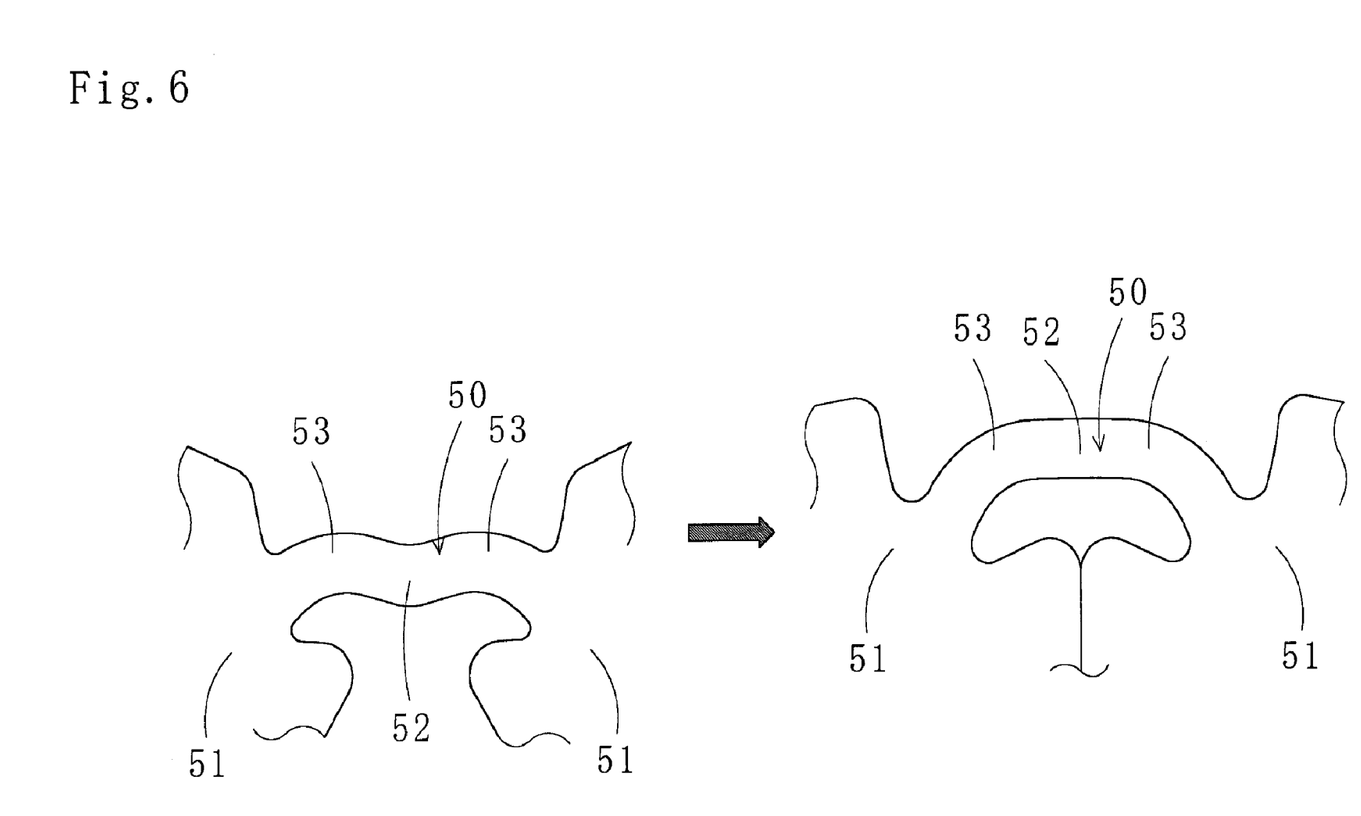
FIG. 6 is a descriptive illustration of before and after bending a connecting portion according to a fourth modification of the laminated core.

Furthermore, as shown in FIG. 6, a connecting portion 50 before being bent may have a wavy form.

The connecting portion 50 has an arc-shaped wave crest 52 provided in the middle portion in the circumferential direction thereof. The arc-shaped wave crest 52 projects in the radially inward side of the segment core sheet 51. Arc-shaped wave troughs 53 projecting radially outward are provided at the both sides of the wave crest 52 to connect the wave crest 52 to the adjacent segment core sheets 51.

Accordingly, the wave crest 52 of the bent connecting portion 50 is substantially straight, thereby curbing, and furthermore, preventing the radial expansion of the connecting portion 50.

The connecting portion 50 having one wave crest and two wave troughs has been described. However, the number of wave crests and the number of wave troughs are not limited thereto, and for example, the connecting portion 50 may be formed by three wave crests and two wave troughs. In this instance, it is preferable that the wave crests are provided in the middle portion in the circumferential direction of the connecting portion.

As illustrated in FIG. 2, the connecting portion 12 has the radial width W which is constant throughout the entire length in the longitudinal direction (hatched part in FIG. 2) of the connecting portion 12 before being bent (the same is true to the other connecting portions 30, 40, 50). Alternatively, the connecting portion may have the constant width only at a part thereof, e.g., at a part of the connecting portion except the both sides in the longitudinal direction thereof.

The width W of the connecting portion 12 before being bent is set to 0.5-5 times the thickness of the segment core sheet 13 (i.e., thickness of the magnetic steel sheet), and thus the width thereof is narrow.

If the width of the connecting portion is less than 0.5 times the thickness of the segment core sheet, the width is so narrow that the connecting portion may break, thereby tearing the segment core sheets apart, for example. On the other hand, if the width of the connecting portion exceeds 5 times the thickness of the segment core sheet, the width is so broad that the radially inward area thereof is subjected to a local compressive stress and the swell in the thickness direction of the connecting portion is liable to form. At the same time, a local tensile stress is applied to the radially outward area of the connecting portion, and the connecting portion is liable to fracture.

The width W of the connecting portion 12 before being bent is set to 0.5-5 times the thickness of the segment core sheet 13. However, the lower limit of the width W is preferably 0.6 times, further preferably 0.7 times the thickness of the segment core sheet 13, and the upper limit is preferably 4 times, and further preferably 3.5 times the thickness of the segment core sheet 13.

Based on this set range, the width W of the connecting portion 12 before being bent is preferably set to 0.25-1 mm (still preferably 0.25-0.7 mm, and further preferably 0.25-0.5 mm).

In this embodiment, the thickness of the segment core sheet 13 is set to 0.35 mm, and the width W of the connecting portion 12 before being bent is set to 0.3 mm. Thus, the width W of the connecting portion 12 is 0.86 times the thickness of the segment core sheet 13, which is within the above set range.

Additionally, it is preferable that a maximum bridging length (i.e., a length of a maximum straight line between the both ends of the connecting portion 12) L of the connecting portion 12 before being bent (the hatched part in FIG. 2) is set to 2-4 mm (3 mm in this embodiment).

If the maximum length of the connecting portion is less than 2 mm, the connecting portion is so short that a local compressive stress is applied to the radially inward region of the connecting portion, which is likely to cause the swell in the thickness direction of the connecting portion. At the same time, a local tensile stress is applied to the radially outward region of the connecting portion and the connecting portion is liable to fracture. On the other hand, if the maximum length of the connecting portion exceeds 4 mm, the length of the connecting portion is too long with respect to the width of the connecting portion. Thus, for example, the connecting portion is liable to break, thereby tearing the segment core sheets apart. Furthermore, the elongation of the connecting portions causes gaps between the adjacent segment core sheets to increase, thereby deteriorating positioning accuracy.

For those reasons, the maximum length L of the connecting portion 12 before being bent is set to 2-4 mm. However, the lower limit and the upper limit thereof are preferably 2.5 mm and 3.5 mm, respectively.

In order to reduce the swell in the thickness direction of the connecting portion 12 compared to one formed in conventional methods, a coining process to press a punch on the connecting portion may be further carried out so that the connecting portion may have a thickness of 70-95%, preferably 80-95% of the original thickness thereof (for example, pressing about 30-40 μm).

The above-mentioned width W and maximum length L of the connecting portion before being bent may be applied to the laminated core having a diameter of, e.g., about 100-2000 mm (300 mm in this embodiment), but the diameter of the laminated core is not limited thereto.

The outer peripheral portion of the above-mentioned connecting portion 12 is pulled in the circumferential direction at the time of the bending of the connecting portion 12, which reduces the thickness of the connecting portion 12. In this instance, the radial bulge 18 is likely to form at the radially outward side, but it is disposed within the concave cutout 19, which causes no problems. On the other hand, the inner peripheral portion of the connecting portion 12 is pushed and shrunk in the circumferential direction, and tends to swell in the thickness direction. However, the swelling is inhibited due to the narrow width, the shape, and the maximum length L of the connecting portion 12.

In this embodiment, the thickness of the segment core sheet 13 is set to 0.35 mm, and the width W and the maximum length L of the connecting portion 12 before being bent are set to 0.3 mm and 3 mm, respectively. Such structure allows the swell in the thickness direction of the connecting portion 12 to be limited to a target value, i.e., less than or equal to 0.005 mm (0.003 mm in this embodiment).

In the radially inward region of the side edges 14 of the adjacent segment core sheets 13, an engaging section 23 which includes a concave cutout 21 and a projection 22 to be fitted therein is provided. The side edges 14 of the adjacent segment core sheets 13 including the concave cutout 21 and the projection 22 are closely spaced apart with, e.g., a gap of 20-30 μm therebetween after the connecting portion 12 is bent. Alternatively, the side edges 14 may be brought into contact with each other.

Due to the structure, mutual positioning of the adjacent segment core sheets 13 is performed more accurately and circular accuracy of the laminated core is improved.

As illustrated in FIG. 1, the plurality of segment core sheets 13 are wound and laminated in a manner that in the laminating direction, whereas the connecting portions 12 between the adjacent segment core sheets 13 are arranged in circumferentially different positions, the positions of the pole sections 16 are aligned with each other. In this embodiment, the connecting portions 12 are displaced from one another in the circumferential direction by one slot. Alternatively, the connecting portions 12 may be displaced from one another by more than one slot.

If the total number of the slots per circle of the laminated core when viewed from the top thereof is "m," the number of the slots (the same as the number of the pole sections) per segment core sheet is "n," and the number of the segment core sheets per circle necessary to displace the connecting portions by one slot in the laminating direction is "k," the following relation is given:

$(m+1)/n=k$ wherein "m," "n," and "k" are positive integers, and variable depending on the manufacturing conditions of the laminated core.

In this embodiment, the total number of the slots per circle of the laminated core when viewed from the top thereof is 20 (m=20), and the number of the pole sections per segment core sheet is 3 (equivalent to three slots: n=3) as shown in FIG. 1. Calculated from the above formula, the number of the segment core sheets necessary for one circle is 7 (k=7). Thus, only one pole section of the seventh segment core sheet is a part of the next layer at the time of laminating the segment core sheets, and the positions of the connecting portions in the laminating direction are displaced by one pole section (equivalent to one slot).

Additionally, if the connecting portions adjacent in the laminating direction are displaced from each other by two or more of the slots in the circumferential direction, the number of the segment core sheets necessary for one circle is calculated by replacing "1" in the above formula by the number of the slots to be displaced, i.e., two or more.

As the positions of the connecting portions 12 of the segment core sheets 13 are displaced in the laminating direction when the plurality of segment core sheets 13 are wound and laminated, coupling strength between the segment core sheets 13 is further enhanced.

Next, a method for manufacturing a laminated core according to one embodiment of the present invention is described.

First, a stamping step is carried out. In this step, the plurality of segment core sheets 13 mutually connected by the connecting portions 12 as illustrated in FIG. 2 are punched out from the magnetic steel sheet (not illustrated) using one or more dies (not illustrated) while the sheet is conveyed.

During the stamping process of the segment core sheets 13, the concave cutouts 19 and the inward cutouts 20 are formed separately after the normal punching process of the slot 15, thereby making the narrow width connecting portions 12. Depending on the shape of the dies, the concave cutouts 19 and the inward cutouts 20 may be formed simultaneously, individually in sequence, in either order, or simultaneously with the stamping of the slots 15.

Further in the stamping step, the connecting portions may be coined to make the connecting portions thinner than the segment core sheets.

Next, an annular-shape forming step is carried out. This step is to wind and laminate the plurality of connected segment core sheets 13 in a spiral form by bending the connecting portion 12 and fitting the concave cutout 21 and the projection 22 of the adjacent segment core sheets 13 with each other while aligning the side edges 14 of the segment core sheets 13 with each other. As a result, the laminated core 10 is produced. At the time of bending the segment core sheets 13, the connected segment core sheets 13 are preferably wound around a cylindrical-shaped or columnar-shaped mandrel having a predetermined diameter thereby to produce the laminated core.

The present invention has been described with reference to one embodiment. However, the present invention is not limited to the structures described in the above embodiment, and is intended to cover other embodiments and modifications made without departing form the spirit and scope of the present invention. For example, a laminated core and a method for manufacturing the same configured by combining a part or all of the above-mentioned embodiment and modifications fall within the range of the present invention.

In the embodiment, the laminated stator core has been described, but the present invention is apparently applicable to a laminated rotor core. In this case, the laminated rotor core is formed of a plurality of segment core sheets, and adjacent segment core sheets are mutually connected by a connecting portion provided between the outer peripheral portions of the segment core sheets. For example, if the connecting portions easily break during the conveyance of the plurality of segment core sheets, ribs may be provided in the inner peripheral portions of the connecting portions to couple the adjacent segment core sheets together more firmly. The ribs may be cut down when the laminated core is produced.

INDUSTRIAL APPLICABILITY

As is clear from the above description, in the laminated core (rotor or stator) and method for manufacturing the same according to the present invention, before being bent, the connecting portion which mutually connects the adjacent segment core sheets has the radial width that is in an appropriate range and narrow with respect to the thickness of the segment core sheet. Accordingly, the swell in the thickness direction caused by bending the connecting portion is reduced, and the bent connecting portion is disposed within the outer circle of the laminated core.

Accordingly, the formation of gaps between the laminated segment core sheets is curbed, and further prevented. Thus, quality control of the laminated core becomes easy, and efficiency of motors using the laminated cores is improved, and vibration of the motors is prevented.

The invention claimed is:

1. A laminated core formed with a plurality of continuous segment core sheets wound and laminated in a spiral form while connecting portions mutually connecting the adjacent segment core sheets are bent and side edges of the adjacent segment core sheets are fitted with each other, the connecting portions being located in an outer peripheral portion of the laminated core, the laminated core comprising:
   a concave cutout provided at a radially outward side of the connecting portion, the concave cutout allowing a radial bulge to be accommodated within an outer circle of the laminated core, the radial bulge formed at a radially outward side of the connecting portion by bending the connecting portion; and
   an inward cutout provided at a radially inward side of the connecting portion, the inward cutout defining a bending position of the connecting portion,
   wherein the connecting portion has a narrow radial width and, before being bent, has a radial width in the range of 0.5 to 5 times a thickness of the segment core sheet.

2. The laminated core as defined in claim 1, wherein, before being bent, the connecting portion has a partly or wholly constant radial width.

3. The laminated core as defined in claim 1, wherein, before being bent, the connecting portion has an arc shape, and a center of curvature radially outside of the segment core sheet.

4. The laminated core as defined in claim 2, wherein, before being bent, the connecting portion has an arc shape, and a center of curvature radially outside of the segment core sheet.

5. The laminated core as defined in claim 3, wherein after being bent, the connecting portion has a straight shape.

6. The laminated core as defined in claim 4, wherein, after being bent, the connecting portion has a straight shape.

7. The laminated core as defined in claim 3, wherein the side edges of the adjacent segment core sheets have respectively pressing portions at radially outward sides thereof, the pressing portions coming into contact with the radially inward side of the connecting portion at the bending of the connecting portion and pushing the connecting portion radially outward.

8. The laminated core as defined in claim 4, wherein the side edges of the adjacent segment core sheets have respectively pressing portions at radially outward sides thereof, the pressing portions coming into contact with the radially inward side of the connecting portion at the bending of the connecting portion and pushing the connecting portion radially outward.

9. The laminated core as defined in claim 1, wherein before being bent, the connecting portion has an arc shape, and a center of curvature radially inside of the segment core sheet.

10. The laminated core as defined in claim 2, wherein before being bent, the connecting portion has an arc shape, and a center of curvature radially inside of the segment core sheet.

11. The laminated core as defined in claim 1, wherein, before being bent, the connecting portion has a wave shape.

12. The laminated core as defined in claim 2, wherein, before being bent, the connecting portion has a wave shape.

13. The laminated core as defined in claim 11, wherein the connecting portion has, at its midsection in a circumferential direction thereof, a wave crest projecting radially inward.

14. The laminated core as defined in claim 12, wherein the connecting portion has, at its midsection in a circumferential direction thereof, a wave crest projecting radially inward.

15. The laminated core as defined in claim 1, wherein a center line extending between an outer edge and an inner edge of the connecting portion has a length unchanged before and after the bending of the connecting portion, the outer edge provided by the formation of the concave cutout, the inner edge provided by the formation of the inward cutout.

16. The laminated core as defined in claim 1, wherein the side edges of the adjacent segment core sheets are closely spaced from each other.

* * * * *